(12) United States Patent
Lindbo et al.

(10) Patent No.: US 12,269,679 B2
(45) Date of Patent: Apr. 8, 2025

(54) MODULAR STORAGE SYSTEMS AND METHODS

(71) Applicant: Ocado Innovation Limited, Hatfield (GB)

(72) Inventors: Lars Sverker Ture Lindbo, Hatfield (GB); Paul Clarke, Hatfield (GB); Andrew John Ingram-Tedd, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 18/421,521

(22) Filed: Jan. 24, 2024

(65) Prior Publication Data

US 2024/0158166 A1 May 16, 2024

Related U.S. Application Data

(63) Continuation of application No. 17/749,718, filed on May 20, 2022, now Pat. No. 11,912,497, which is a
(Continued)

(30) Foreign Application Priority Data

May 17, 2017 (GB) ..................................... 1707922

(51) Int. Cl.
*B65G 1/04* (2006.01)
*B61B 3/00* (2006.01)
(Continued)

(52) U.S. Cl.
CPC .............. *B65G 1/0464* (2013.01); *B61B 3/00* (2013.01); *B65D 19/385* (2013.01); *B65G 1/02* (2013.01);
(Continued)

(58) Field of Classification Search
CPC ...... B65G 1/0464; B65G 1/02; B65G 1/0478; B65G 2201/0235; B61B 3/00;
(Continued)

(56) References Cited

U.S. PATENT DOCUMENTS 2,701,065 A 2/1955 Bertel
3,514,170 A 5/1970 Shewchuk
(Continued)

FOREIGN PATENT DOCUMENTS

CN 101553398 A 10/2009
CN 201959571 U 9/2011
(Continued)

OTHER PUBLICATIONS

The extended European Search Report issued on Mar. 22, 2024, by the European Patent Office in corresponding European Application No. 24150600.5. (14 pages).
(Continued)

*Primary Examiner* — Thomas Randazzo
(74) *Attorney, Agent, or Firm* — Buchanan Ingersoll & Rooney PC

(57) ABSTRACT

A customisable modular storage system is described where goods are stored in containers and the containers are stored in stacks. The stacks are contained within towers formed of stacks of bin receiving units. A grid network of tracks is provided on the top of the bin receiving units upon which load handling devices run. The load handling devices take containers from the stacks and deposit them at alternative locations in the stacks or deposit then at stations where goods may be picked out.

20 Claims, 14 Drawing Sheets

Related U.S. Application Data continuation of application No. 16/614,026, filed as application No. PCT/EP2018/062785 on May 16, 2018, now Pat. No. 11,370,578.

(51) Int. Cl.
   *B65D 19/38* (2006.01)
   *B65G 1/02* (2006.01)

(52) U.S. Cl.
   CPC .. *B65G 1/0478* (2013.01); *B65D 2501/24554* (2013.01); *B65D 2501/2456* (2013.01); *B65D 2501/24573* (2013.01)

(58) Field of Classification Search
   CPC ........ B65D 19/385; B65D 2501/24554; B65D 2501/2456; B65D 2501/24573
   See application file for complete search history.

(56) References Cited

U.S. PATENT DOCUMENTS

| | | | |
|---|---|---|---|
| 3,758,181 | A | 9/1973 | Bolyos |
| 3,863,799 | A | 2/1975 | Thomaswick et al. |
| 4,243,279 | A | 1/1981 | Ackeret |
| 4,612,996 | A | 9/1986 | Wolf et al. |
| 4,809,851 | A | 3/1989 | Oestreich et al. |
| 5,887,529 | A | 3/1999 | John et al. |
| 7,850,412 | B2 | 12/2010 | Benedict et al. |
| 9,796,080 | B2 | 10/2017 | Ingram-Tedd et al. |
| 9,994,375 | B2 | 6/2018 | Zacchi |
| 10,556,742 | B2 | 2/2020 | Lindbo et al. |
| 11,008,165 | B2 * | 5/2021 | Gravelle ............. B65G 1/0478 |
| 11,912,497 | B2 * | 2/2024 | Lindbo ............... B65G 1/0478 |
| 2003/0136781 | A1 | 7/2003 | Rumpel |
| 2005/0220573 | A1 | 10/2005 | Benedict et al. |
| 2008/0075568 | A1 | 3/2008 | Benedict et al. |
| 2011/0263190 | A1 | 10/2011 | Stump et al. |
| 2012/0012492 | A1 | 1/2012 | Darden |
| 2013/0223227 | A1 | 8/2013 | Lee et al. |
| 2015/0298856 | A1 | 10/2015 | Shiotani et al. |
| 2016/0129587 | A1 | 5/2016 | Lindbo et al. |
| 2016/0194151 | A1 | 7/2016 | Lindbo et al. |
| 2017/0172318 | A1 | 6/2017 | Wang |
| 2017/0240356 | A1 * | 8/2017 | Benedict ............. B65G 1/0464 |
| 2017/0305596 | A1 | 10/2017 | Dag |
| 2018/0037411 | A1 | 2/2018 | Lindbo et al. |
| 2018/0043528 | A1 | 2/2018 | Lindbo et al. |
| 2018/0072546 | A1 | 3/2018 | Hognaland |
| 2018/0148259 | A1 * | 5/2018 | Gravelle ................. B65G 1/04 |
| 2018/0273245 | A1 | 9/2018 | Sommer |
| 2019/0062050 | A1 * | 2/2019 | Benedict ............. B65G 1/0464 |
| 2020/0148471 | A1 | 5/2020 | Lindbo et al. |
| 2020/0223629 | A1 | 7/2020 | Lindbo et al. |
| 2022/0281637 | A1 | 9/2022 | Lindbo et al. |

FOREIGN PATENT DOCUMENTS

| | | |
|---|---|---|
| CN | 105517923 A | 4/2016 |
| CN | 106061330 A | 10/2016 |
| CN | 106414278 A | 2/2017 |
| CN | 106536277 A | 3/2017 |
| EP | 0767113 B1 | 7/2002 |
| EP | 1037828 B1 | 9/2003 |
| EP | 3625152 A1 | 3/2020 |
| GB | 2520104 A | 5/2015 |
| JP | S61114905 A | 6/1986 |
| JP | 2001072177 A | 3/2001 |
| JP | 2012056659 A | 3/2012 |
| JP | 2016183050 A | 10/2016 |
| JP | 2017039507 A | 2/2017 |
| KR | 20160040690 A | 4/2016 |
| NO | 317366 B1 | 10/2004 |
| WO | 2006029288 A2 | 3/2006 |
| WO | 2016010568 A1 | 1/2016 |
| WO | 2016172793 A1 | 11/2016 |
| WO | 2017178370 A1 | 10/2017 |
| WO | 2018210952 A1 | 11/2018 |

OTHER PUBLICATIONS

Second Office Action issued on Jun. 26, 2024, by the Chinese Patent Office in corresponding Chinese Patent Application No. 202210373486.8, and an English Translation of the Office Action. (13 pages).
Combined Search and Examination Report under Section 17 dated Nov. 13, 2018, issued by the European Patent Office in the corresponding European Patent Application No. GB1807943.4. (5 pages).
First Office Action issued on Apr. 19, 2022, by the Japanese Patent Office in corresponding Japanese Patent Application No. 2021-071893, and an English Translation of the Office Action. (5 pages).
International Search Report (PCT/ISA/210) issued on Aug. 23, 2018, by the European Patent Office as the International Searching Authority for International Application No. PCT/EP2018/062785.
Office Action issued on Mar. 2, 2022, by the Canadian Patent Office in corresponding Canadian Patent Application No. 3,061,839. (3 pages).
The extended European Search Report issued on Dec. 22, 2021, by the European Patent Office in corresponding European Application No. 21195203.1. (12 pages).
Written Opinion (PCT/ISA/237) issued on Aug. 23, 2018, by the European Patent Office as the International Searching Authority for International Application No. PCT/EP2018/062785.
Office Action issued on Jan. 7, 2021, by the Canadian Patent Office in corresponding Canadian Patent Application No. 3,061,839, 5 pages.
First Office Action issued on Oct. 22, 2020, by the Chinese Patent Office in corresponding Chines Patent Application No. 201880032237.4, and an English Translation of the Office Action, 14 pages.
Office Avtion (Combined Search and Examination Report) issued on Nov. 16, 2017, by the Great Britain Patent Office in corresponding Great Britain Patent Application No. GB 1707922.9, 5 pages.
First Office Action issued on Oct. 6, 2020, by the Japanese Patent Office in corresponding Japanese Patent Application No. 2019-563507, and an English Translation of the Office Action, 8 pages.
Office Action (Request for Submission of an Opinion) issued Mar. 30, 2023, by the Korean Intellectual Property Office in corresponding Korean Patent Application No. 10-2022-7024178 and an English translation of the Office Action. (6 pages).
Office Action issued on Sep. 22, 2023, by the Korean Patent Office in corresponding Korean Patent Application No. 10-2022-7024178, and an English Translation of the Office Action. (7 pages).
Office Action issued on Sep. 29, 2023, by the Canadian Patent Office in corresponding Canadian Patent Application No. 3,168,431. (6 pages).
Office Action issued on Sep. 9, 2023, by the Chinese Patent Office in corresponding Chinese Patent Application No. 202210373486.8, and an English Translation of the Office Action. (29 pages).

\* cited by examiner

MODULAR STORAGE SYSTEMS AND METHODS

RELATED APPLICATIONS

The present application is a continuation of U.S. patent application Ser. No. 17/749,718 filed on May 20, 2022, which is a continuation of U.S. patent application Ser. No. 16/614,026, now U.S. Pat. No. 11,370,578, filed on Nov. 15, 2019, which claims priority to International Application PCT/EP2018/062785 filed on May 16, 2018, which claims priority to British application 1707922.9 filed in Great Britain on May 17, 2017, the entire content of each prior application is incorporated by reference.

FIELD

The present invention relates to storage systems. More specifically but not exclusively, it relates to modular, customisable, storage system which can be quickly and easily constructed and deconstructed.

BACKGROUND

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above by load handling devices, removing the need for aisles between the rows and allowing more containers to be stored in a given space.

Methods of handling containers stacked in rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

Other forms of robotic load handling device are further described in, for example, Norwegian patent number 317366. FIGS. 3a and 3b are schematic perspective views of a load handling device from the rear and front, respectively, and FIG. 3c is a schematic front perspective view of a load handling device lifting a bin.

A further development of load handling device is described in UK Patent Application No. 1314313.6 (Ocado) published as GB 2520104 A1 where each robotic load handler only covers one grid space, thus allowing higher density of load handlers and thus higher throughput of a given size system. However, any suitable form of load handling device may be used.

In such known storage systems a large number of separate stacks are positioned within a storage grid. Flexing, twisting, buckling or swaying movements within the stacks or minor positioning errors of individual stacks can deleteriously affect the functioning, efficiency, reliability and lifespan of the grid, tracks or the handling devices. These problems are particularly acute when the stacks are very numerous or tall.

SUMMARY

According to the invention there is provided a storage system comprising: a plurality of base plates each comprising one or more interlocking means; a plurality of stacking bin receiving units each comprising one or more interlocking means; a plurality of stacks of bins; a plurality of rails; at least one load handling device.

In a second aspect the invention provides a method of constructing or deconstructing a storage system as claimed in any preceding claim comprising interlocking or detaching a plurality of base plates, to or from a plurality of bin receiving units.

Further preferred aspects of the invention are detailed in the claims.

In this way, the present invention overcomes the problems of the prior art and provides a quick, simple and reliable way of constructing a storage system of any desired shape or size in which the positioning, and movement of each stack of storage bins is tightly and accurately controlled.

DESCRIPTION OF THE DRAWINGS

The invention will now be described with reference to the accompanying diagrammatic drawings in which.

DETAILED DESCRIPTION

Figure 1:
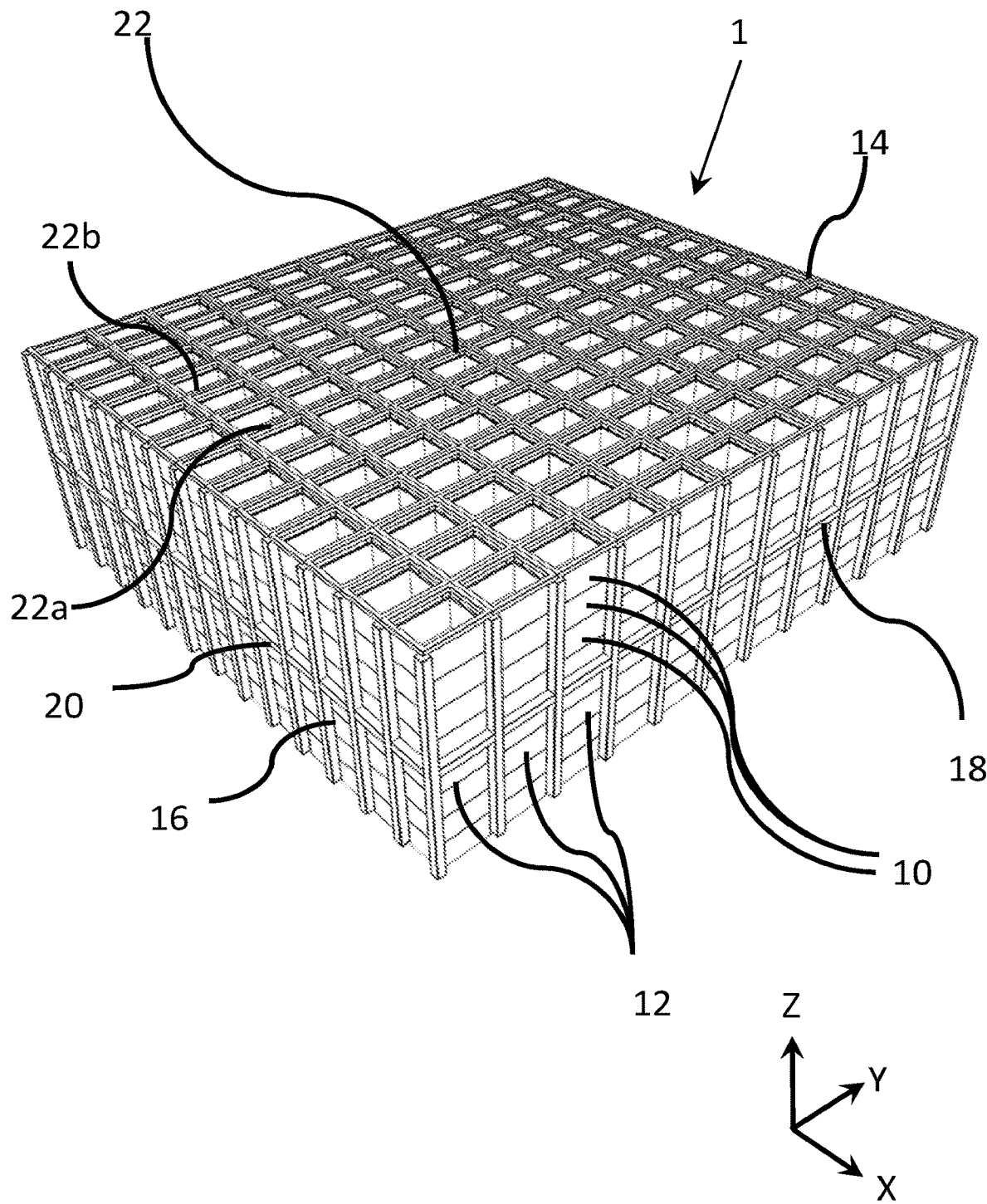
FIG. 1 is a schematic perspective view of a frame structure for housing a plurality of stacks of bins in a storage system.
Figure 2:
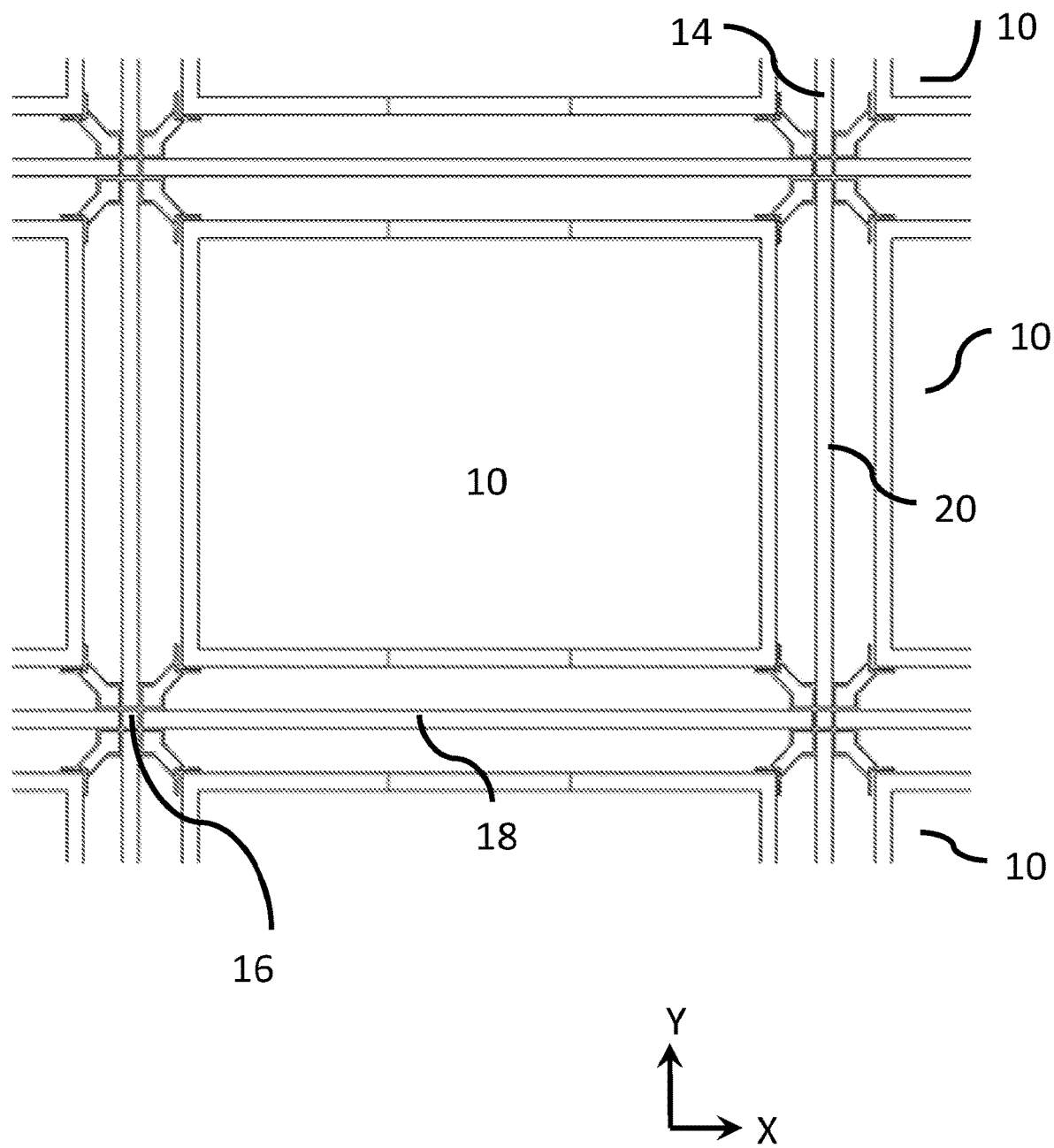
FIG. 2 is a schematic plan view of part of the frame structure of FIG. 1.

As shown in FIGS. 1 and 2, stackable containers, known as bins 10, are stacked on top of one another to form stacks 12. The containers or bins 10 comprising the stacks 12 are formed such that, when in situ in stacks 12, the containers or bins 10 are releasably interlocked so as to form a structure in which each of the individual containers 10 may contain items. The stacks 12 are arranged in a frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

Figure 3A:
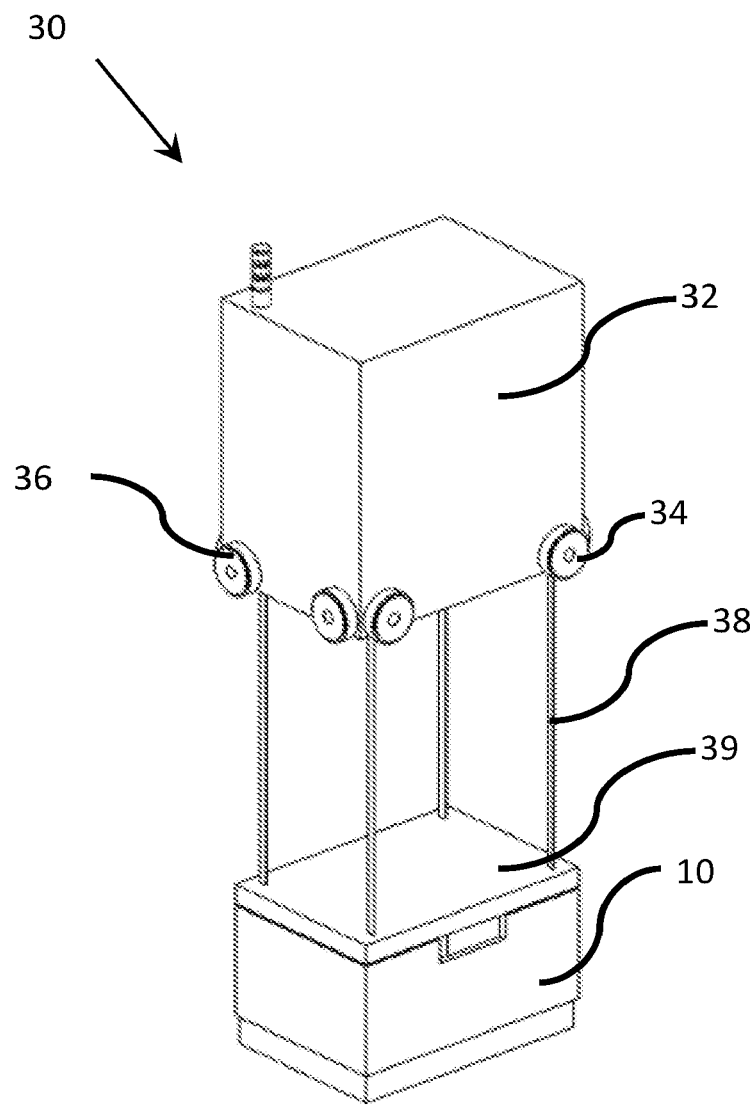
FIGS. 3a and 3b are schematic perspective views, from the rear and front respectively, of one form of robotic load handling device for use with the frame structure of FIGS. 1 and 2.
Figures 3B, 3C:
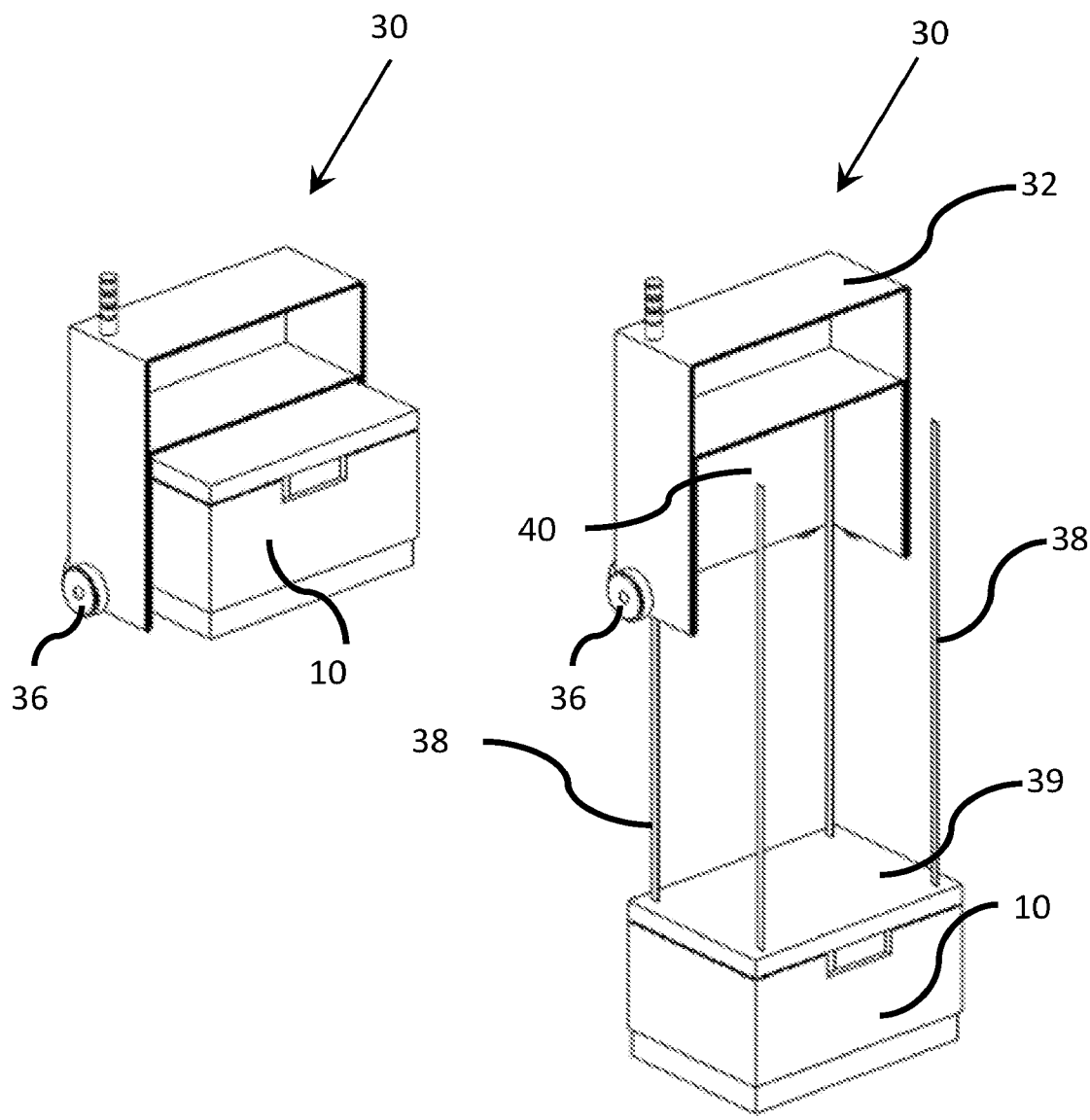
FIG. 3c is a schematic perspective view of the known load handler device in use lifting a bin.
Figure 4:
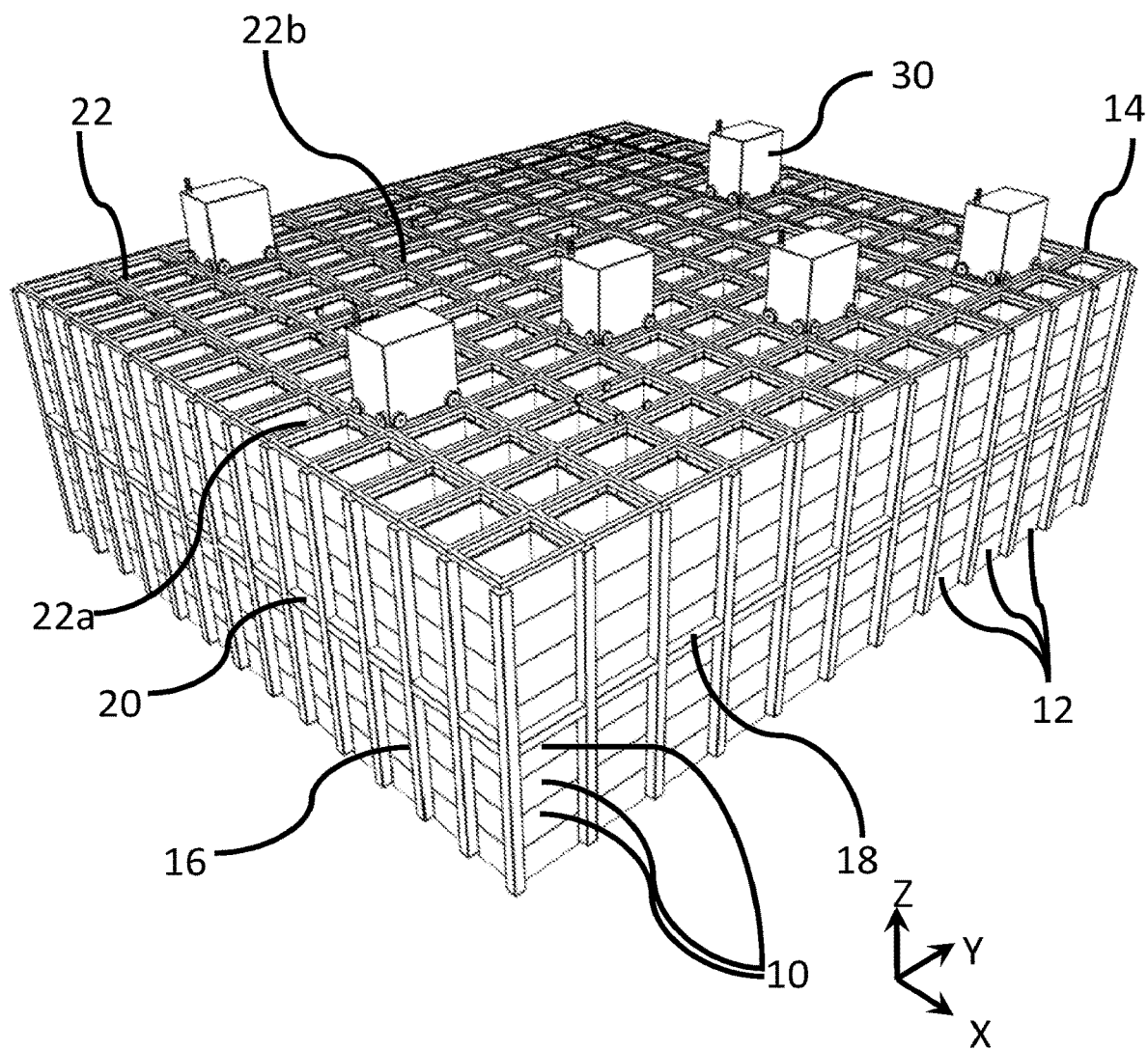
FIG. 4 is a schematic perspective view of a known storage system comprising a plurality of load handler devices of the type shown in FIGS. 3a, 3b and 3c, installed on the frame structure of FIGS. 1 and 2, together with a robotic service device in accordance with one form of the invention.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move independently around the top surface of the stacks 12 on the frame structure 14 under the control of a central picking system (not shown).

FIG. 4 shows a typical storage system as described above, the system having a plurality of load handling devices 30 active on the stacks 12.

FIGS. 1 and 4 show the containers or bins 10 in stacks 12 within the storage system. It will be appreciated that there may be a large number of containers or bins 10 in any given storage system and that many different goods may be stored in the stacks and each bin may contain different goods within a single stack.

The storage system described with reference to FIGS. 1 to 4 comprises a significant structure and whilst partly modular in form, comprises engineering components of a significant weight and size. The installation and commissioning of such a storage system may require several weeks. Furthermore shipping the components to a required location may take some time and require a significant infrastructure and multiple heavy goods vehicles. The present invention provides a modular storage system which can be readily customised and easily shipped and installed.

As can be seen in FIGS. 5 to 8, the storage and picking system of the present invention comprises a series of component parts that may be readily shipped in a deconstructed manner and installed to form a storage structure in a more efficient manner than the system described with reference to FIGS. 1 to 4.

Figure 5:
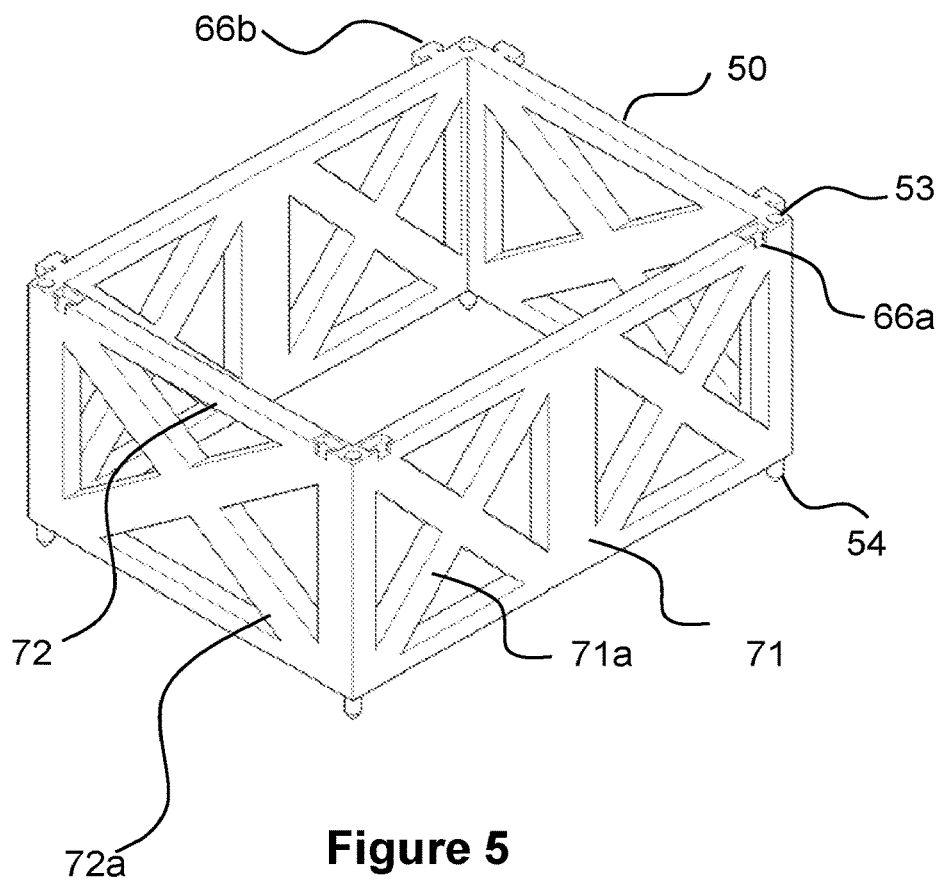
FIG. 5 is a schematic perspective view of a bin receiving unit in accordance with one form of the invention.

As shown in FIG. 5, the first component part of the storage structure comprises a bin receiving unit 50. The bin receiving unit 50 comprises a four-sided, substantially collar-shaped structure. The collar structure, shown in FIG. 5, comprises sides 71, 72 forming the substantially rectangular cross-section, the sides 71, 72 comprising reinforcement webs 71a 72a respectively. Each four sided bin receiving unit 50 has one or more locating pins 54 and one or more openings 53 in the bottom and top surfaces of the structure respectively. Furthermore, bin receiving units 50 comprise interlocking openings 66a and protrusions 66b located on the sides 71, 72 of the unit 50. The interlocking openings 66a and protrusions 66b are sized and shaped so as to allow two or more bin receiving units 50 to be removably attached together.

It will be appreciated that the bin receiving unit 50 need not be formed by sides 71, 72 comprising a structural framework 71a 72a but could be formed from solid sides (not shown). It will be appreciated that the bin receiving units 50 must be constructed such that the corners 51 provide sufficient strength and rigidity to form strong uprights depending on the height of stacks 12 to be used within the storage system.

The strength of the sides 71 and 72 of the bin receiving units and the number, strength, location, profile, material and size of the interlocking openings 66a and protrusions 66b must be selected to ensure the rigidity and strength on the storage system depending on the total number and height of the stacks 12.

The bin receiving unit 50 may be formed from any suitable material having the required structural characteristics. For example, the unit 50 may be formed from suitable plastics material. These may include but need not be limited to such as polypropylene, high density polyethylene (HDPE), polyvinyl chloride (PVC), acrylonitrile butadiene styrene (ABS), or polycarbonate or any composite combination thereof.

Furthermore, the bin receiving unit 50 may be formed from any other suitable structural material such as suitable metals or metal alloys or composites formed from any combination of suitable materials such as glass or carbon fibre reinforced plastics materials.

Figure 6:
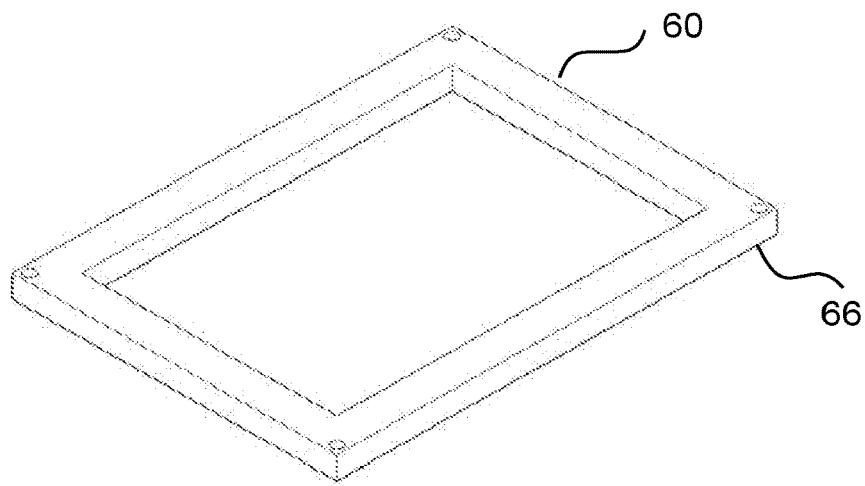
FIG. 6 is a schematic perspective view of a locating base unit in accordance with one form of the invention.

The second component part of the storage structure comprises a locating base plate 60, the base plate 60 comprising a substantially planar base of a rectangular cross section comparable in size to that of the bin receiving unit 50. As shown in FIG. 6, this may comprise a four sided frame having one or more openings 56b positioned in respective corners of the plate or frame 60. The openings 56b are sized and positioned in the frame in such a manner so as to be able to receive locating pins 54 from the underside of a bin receiving unit 50 positioned on top of the base plate 60.

Optionally the locating base plates 60 may have interlocking pins and openings (not shown) to join them together to form a single locating base structure.

The third component part of the modular storage system comprises a bin 10 suitable for storing goods. Such bins 10 may be formed from suitable plastics material as described above with reference to the bin receiving units 50. However, the bin 10 may be formed from any suitable material capable of stacking and storing the goods therein. IT will be appreciated that the bin receiving units 50 need not be formed from the same material as the containers or bins 10, each having differing structural requirements.

Figure 7:
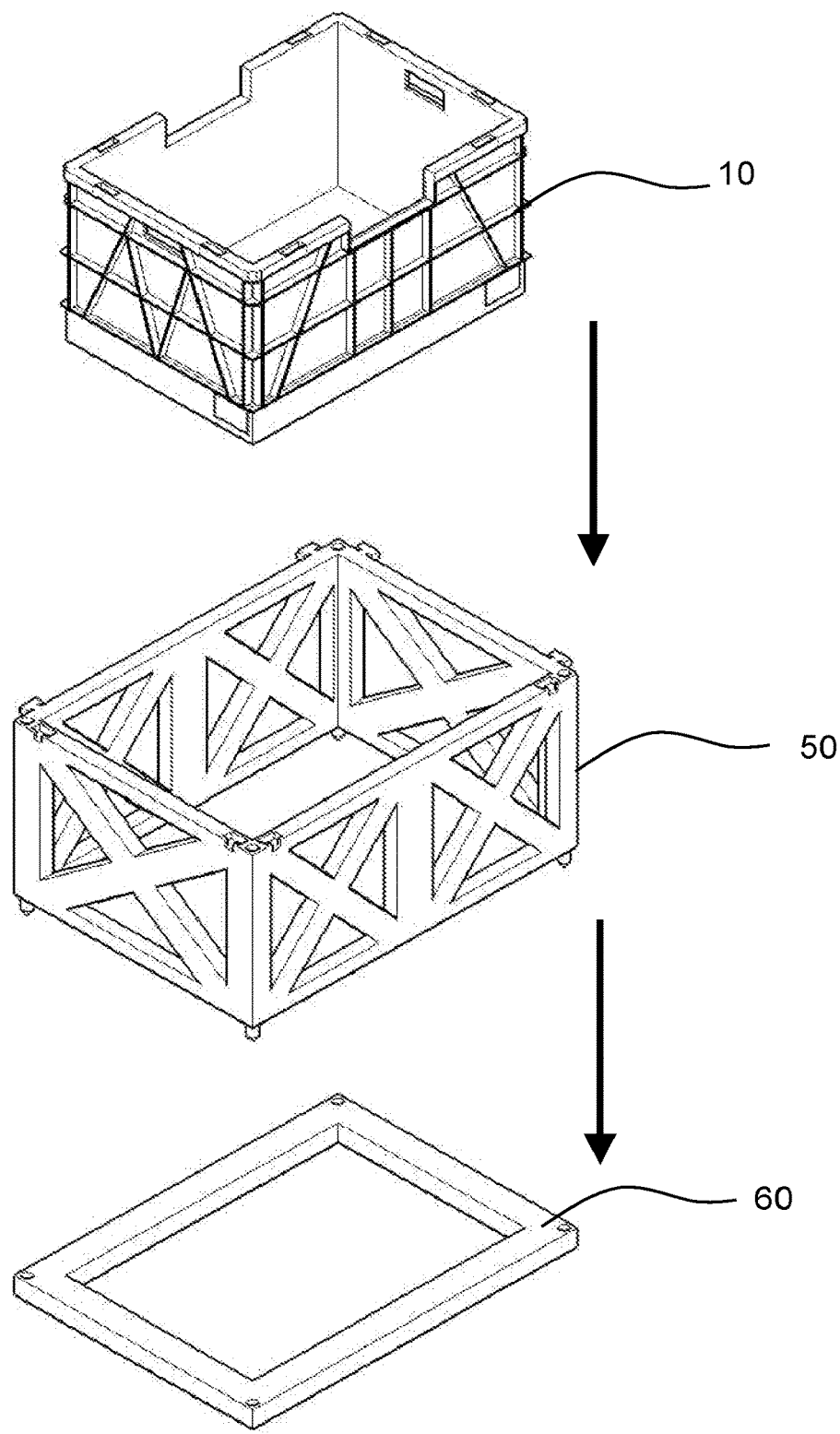
FIG. 7 is a schematic perspective view of a bin inside a bin receiving unit which attaches to a base unit in accordance with one form of the invention.
Figure 8:
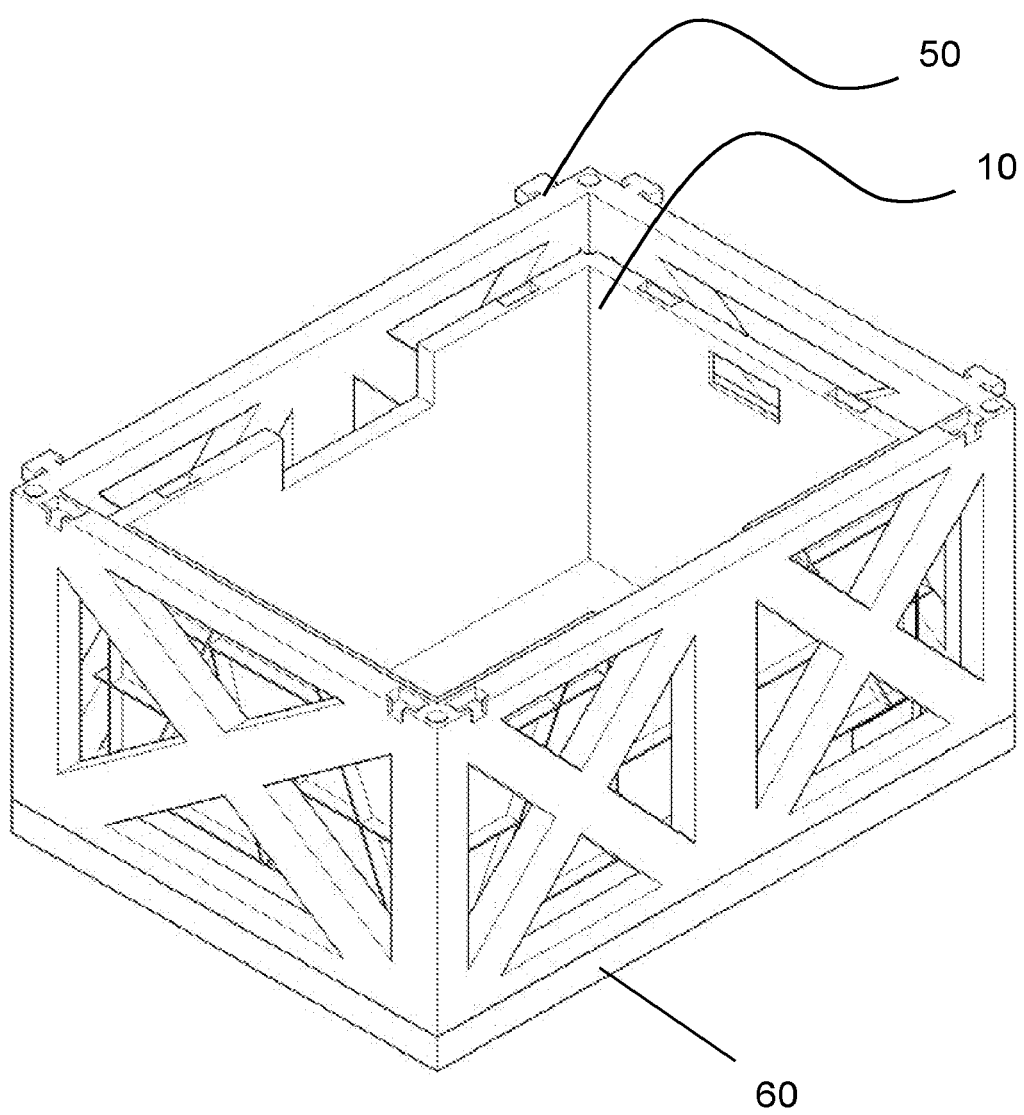
FIG. 8 is schematic perspective view of a bin positioned inside a bin receiving unit on a base unit in accordance with one form of the invention.

As shown in FIG. 7 the bins 10 are sized so as to be locatable within the volume of the bin receiving units 50.

The fourth and fifth component parts of the modular storage system comprise a series of track support sections 25 and a series of track sections 26.

The track support sections 25 may be formed from any suitable structurally resilient material. This may include plastics materials as described in relation to the bin receiving units 50 above. However, it will be appreciated that the track support sections may be formed from any material capable of supporting the track sections 26 and any dynamic or static loading thereof.

The final component of the modular storage system comprises a load handling device 30. The load handling device may take the form of that described with reference to the prior art system shown in FIGS. 1 to 4, a load handling device 30 having a footprint sized so as to be able to lift and receive a bin 10 and to locate over the bin receiving unit 50. However, any other form of load handling device may be used capable of releasably attaching to a bin 10 and lifting the bin 10 out of the storage structure comprising the bin receiving units 50, and returning the bin 10 to the structure as required.

In use, as described with reference to FIG. 7, a single bin receiving unit 50 is joined to each locating base plate by interlocking the locating pins 54 and the openings 56.

Whilst the pins 54 and openings 53 are shown on the bottom and top surfaces of the bin receiving unit 50 respectively, it will be appreciated that any combination of pins and opening in the bin receiving units 50 and base units 60 may be used such that the bin receiving unit 50 is positionally secured in the base plate 60.

Adjacent bin receiving units 50 are joined together by the one or more interlocking openings 66a and protrusions 66b.

Figure 9:
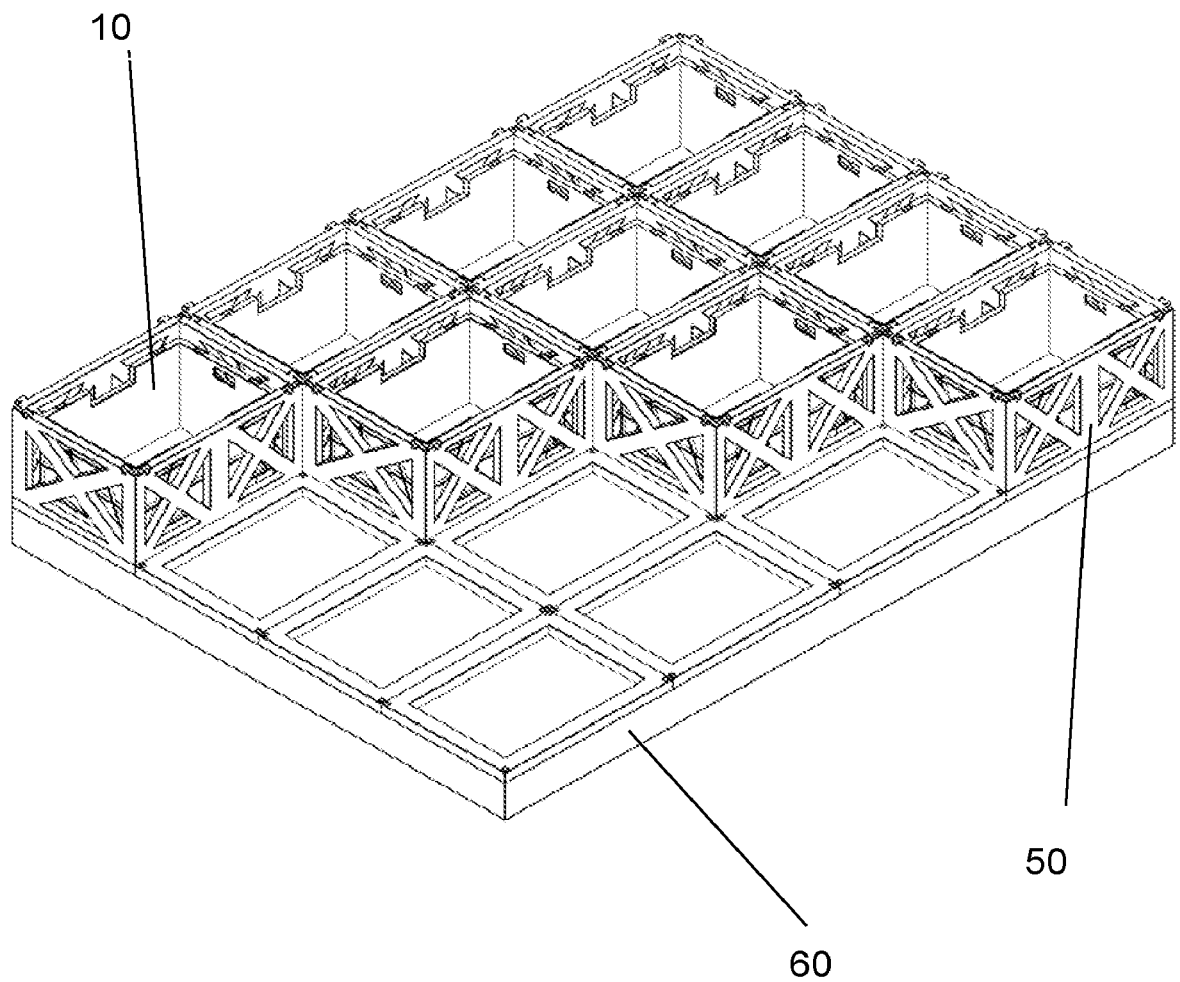
FIG. 9 is a schematic perspective view showing an incomplete single layer of bins in bin receiving units positioned on a base comprising multiple, modular locating base units in accordance with one form of the invention.

As shown in FIG. 9, in the manner described above with reference to FIG. 7, a layer of bins 10 is located in bin receiving units 50, the units 50 being securely located in a base layer, may be built up. (FIG. 9 shows the modular storage structure with some bin receiving units 50 missing for clarity purposes) A second or subsequent layer of four sided bin receiving units 50 may be positioned on top of the lower layer such that locating pins 54 in the upper bin receiving unit interlock with openings 53 in the lower bin receiving unit so as to form a tower comprising layers of bin receiving units 50.

Figure 10:
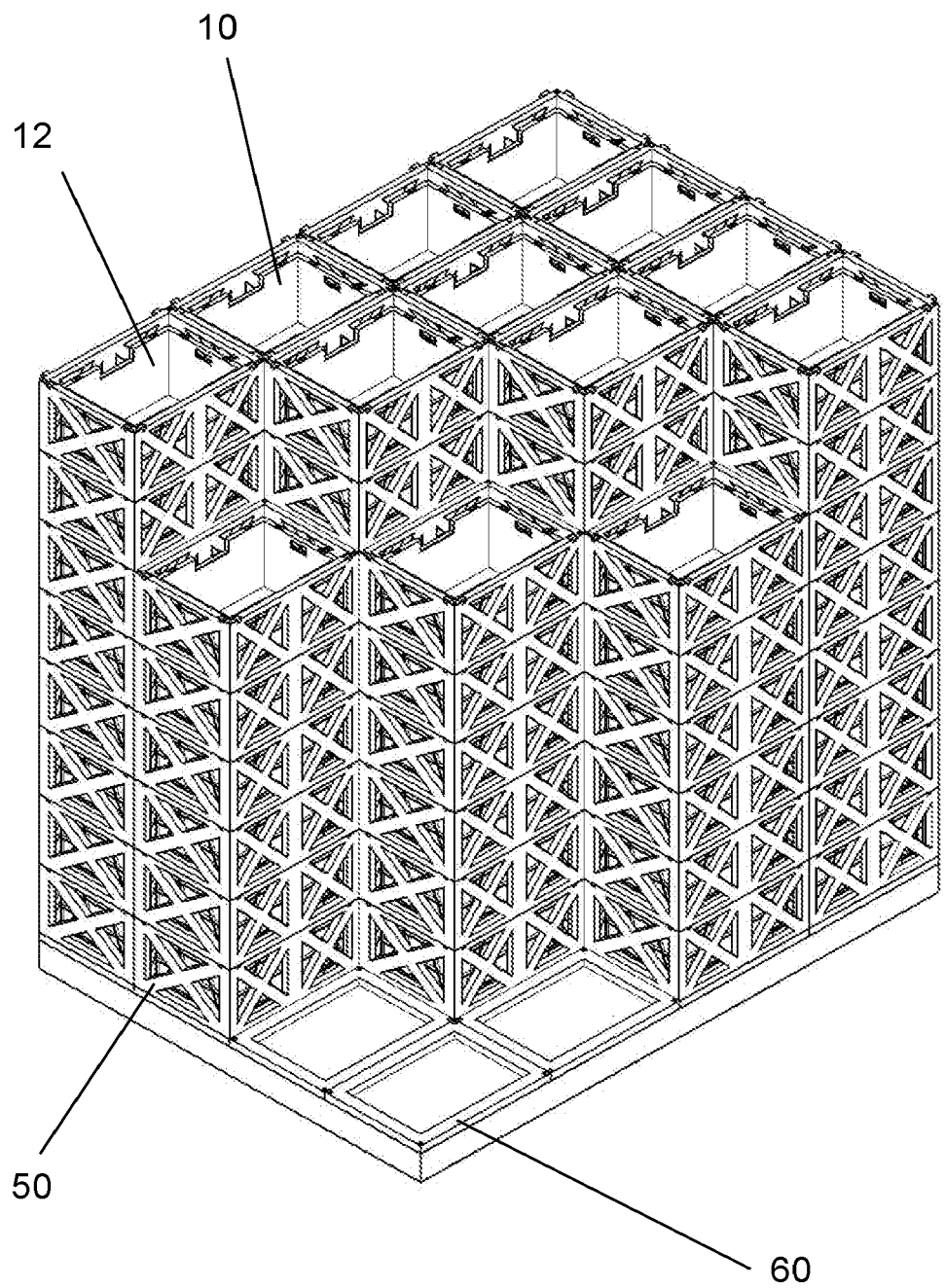
FIG. 10 is a schematic perspective view showing the same incomplete arrangement of bin receiving units as FIG. 9 in which several layers of bins and bin receiving units have been stacked on top of one another to form a storage system in accordance with one form of the invention.

In this manner a storage system may be built up in layers until the desired volume or height is reached. FIG. 10 shows an 8 bin high system, again with some bin receiving units 50 missing for clarity.

Figure 11:
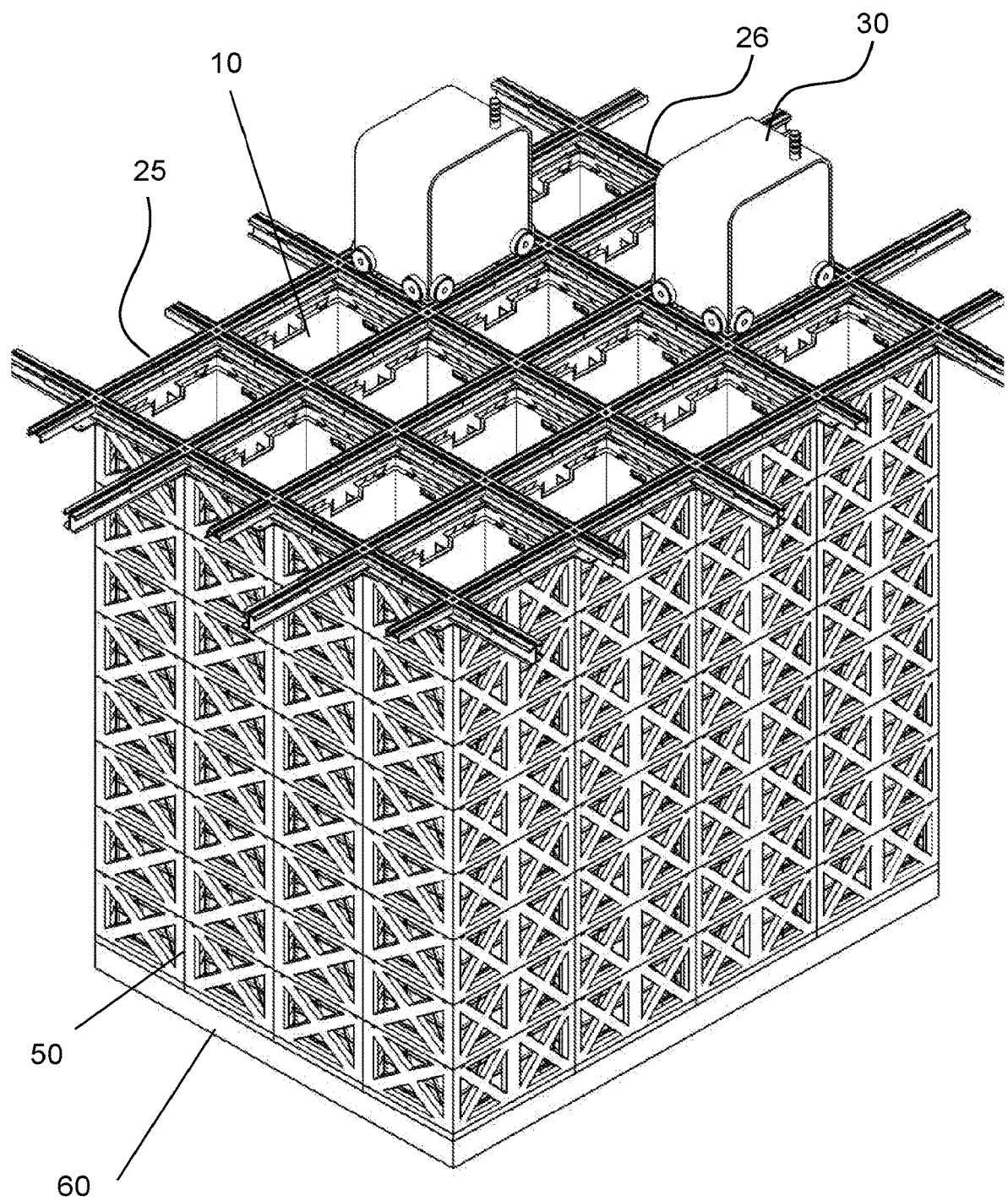
FIG. 11 is a schematic perspective view showing the same incomplete arrangement of bin receiving units as FIGS. 9 and 10 also showing track supports, tracks and load handling devices on the top of the storage system.

Referring to FIG. 11 when the storage system has reached the desired size and height track support sections 26 are removably attached to the uppermost layer of bin receiving units 50 by engaging one or more interlocking locating pins 54 in each track support section with openings 53 in the uppermost bin receiving units 50. Track sections 26 are then removably attached to the track support sections 25. In this way, rails are created on which the load handling device 30 can move, the rails being arranged in a grid pattern across the uppermost layer of bin receiving units 50.

At least one suitable load handling device 30 may then be placed on the rails and operated under the control of a suitable wireless communications system to remove and replace bins 10 as necessary from the structure.

Bins 10 are inserted into the towers of bin receiving units 50 to form stacks 12 of bins 10. The each load handling device may be used to locate and place the bins 50 in the bin receiving units 50. The bins may contain goods or may be empty awaiting the good to be stored.

It will be appreciated that other forms of tracks or rails may be used, with or without support sections, depending on the static and dynamic loading anticipated on the storage system.

Alternatively conventional rails may be applied to the top of the storage system as is well known in the art.

Figure 12A:
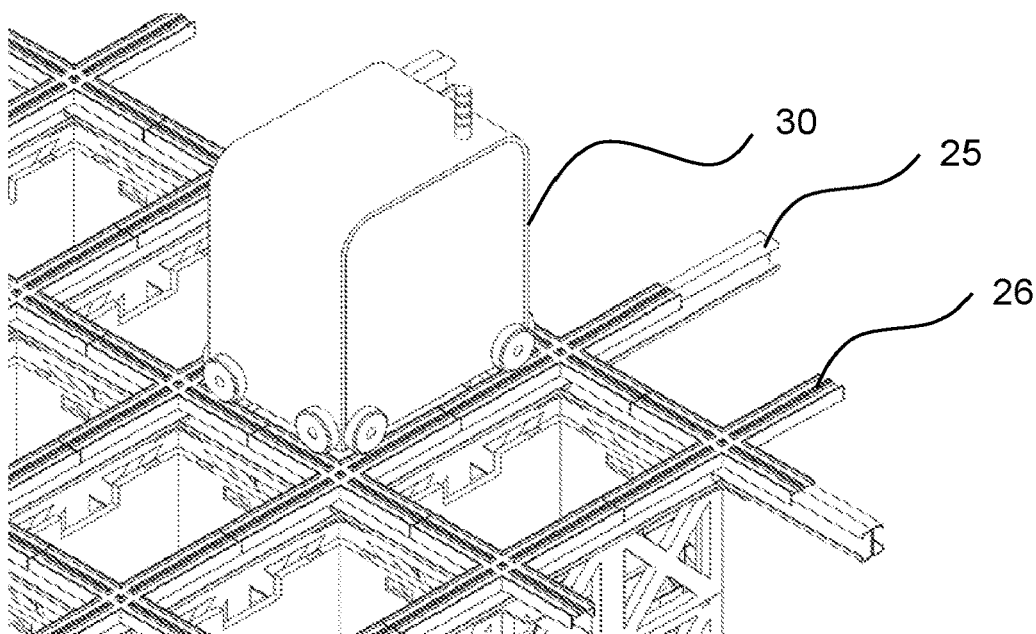
FIG. 12a is a schematic perspective view of one form of track support and track in accordance with one form of the invention, in situation on the uppermost layer of the storage system of FIG. 11, the track support and track forming a grid on which a load handling device is operable.
Figure 12B:
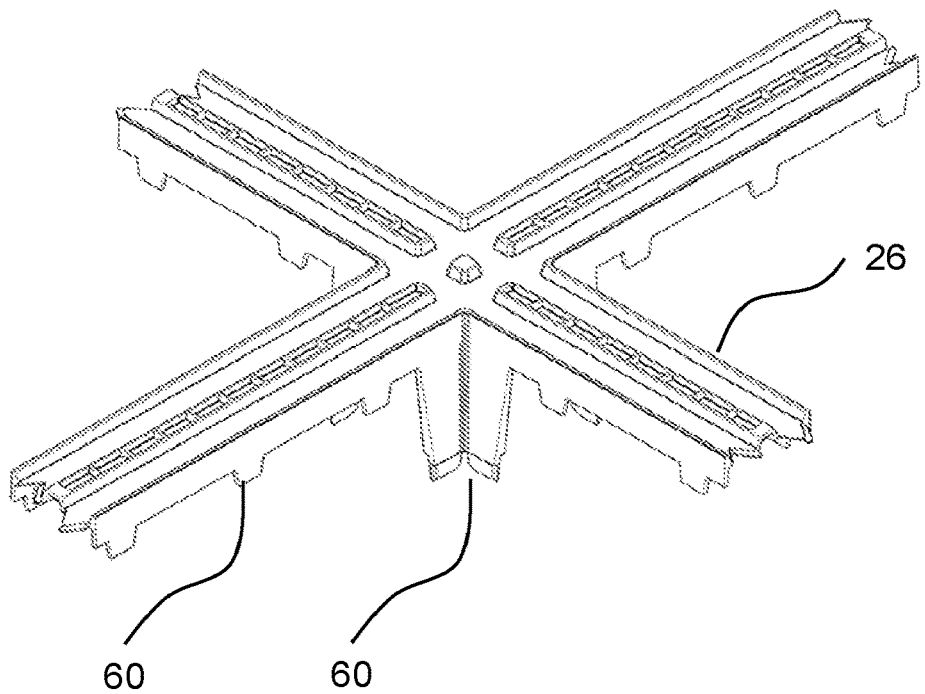
FIG. 12b is a schematic perspective view of a section of the track of FIG. 12a in accordance with one form of the invention.

FIGS. 12a and 12b show one form of suitable track support section 25 and track section 26.

The track support sections 25 comprise sections of longitudinally extending, substantially I-shaped cross-sectional beams. The length of the support section 25 beams is selected such that when installed on the uppermost layer of bin receiving units 50, a lamellar form of support structure is achieved. That is the joints between support sections 25 are not positioned at the same point with reference to the bin receiving units 50 in any adjacent tower. In this way the structural integrity of the track support is maintained.

As shown in FIG. 12b, one form of track section 26 comprises a substantially cross-shaped planar portion. The top surface of the planar portion comprises mouldings acting as rails on which the load handling device 30 can run. In order to locate the track sections 26 on the support sections 25, the track sections 26 comprise a downwardly extending series of lips 60. The lips 60 releasably attach the track sections 26 to the support sections so as to structurally locate the track sections 26 on the support section 25.

As shown in FIG. 12a, the cross-shaped track sections 26 are installed on the support sections 25 located on the uppermost layer of bin receiving units 50 so as to form a grid pattern of tracks to act as rails on which load handling device 30 may operate.

In this way, the combination of the lamellar structure of the support sections 25 and the planar, cross-shaped track sections when assembled, provides an easily installable, flat set of rails on which load handling devices may operate.

Figure 13A:
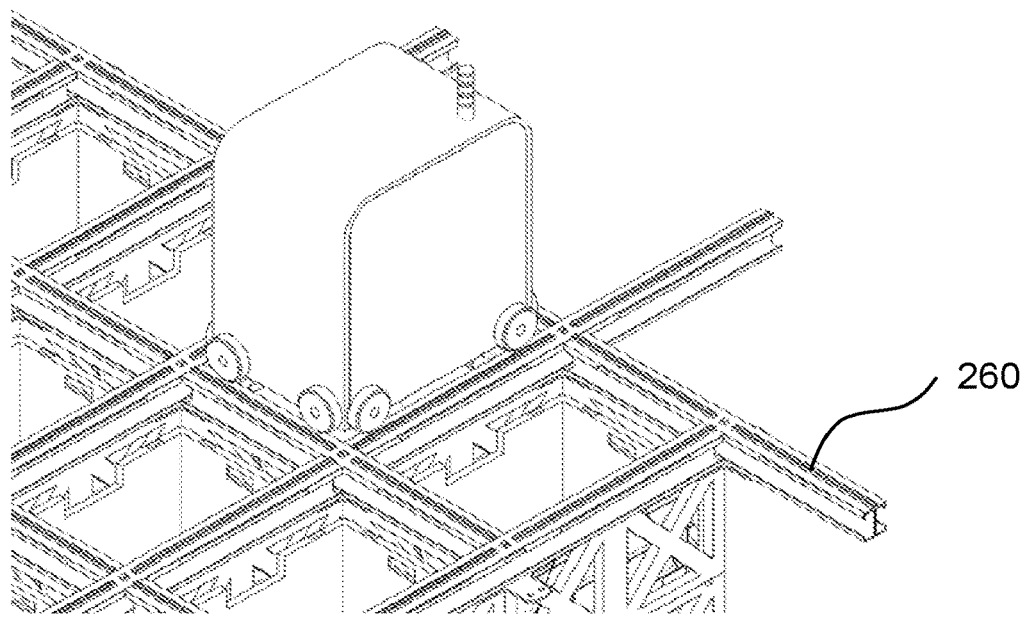
FIG. 13a is a schematic perspective view of a further form of track support and track in accordance with one form of the invention, in situation on the uppermost layer of the storage system of FIG. 11, the track support and track forming a grid on which a load handling device is operable.
Figure 13B:
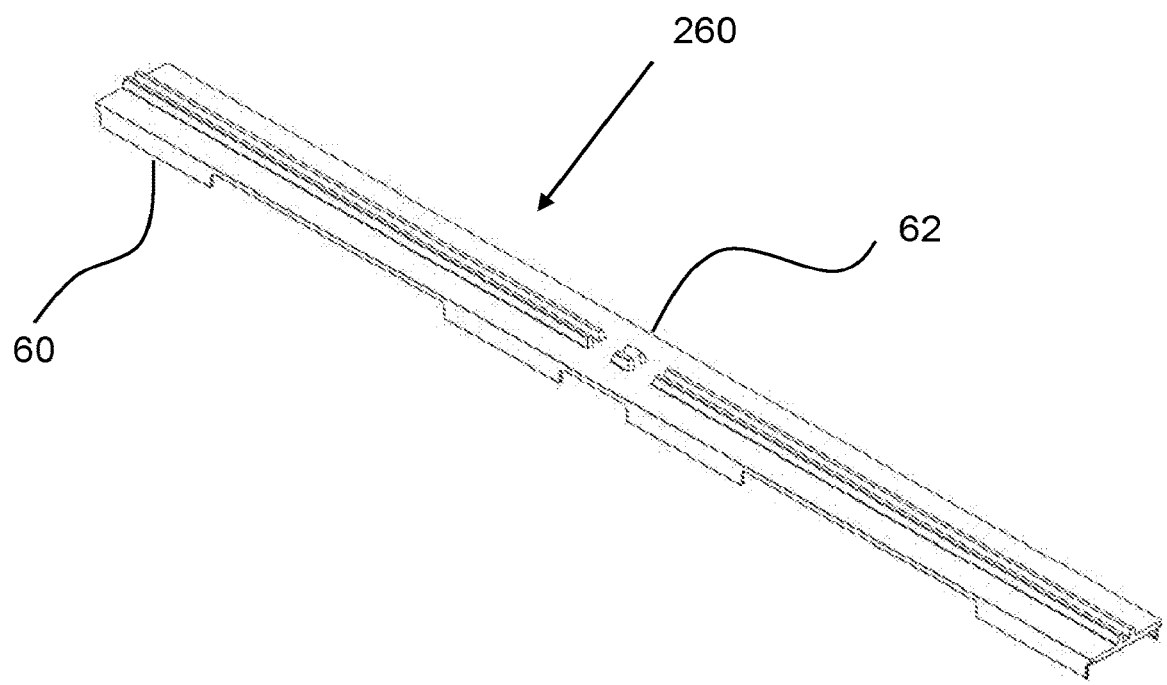
FIG. 13b is a schematic perspective view of a section of the track of FIG. 13a in accordance with a further form of the invention.

FIGS. 13a and 13b show an alternative form of track section 260. The track section shown in FIG. 13b comprises a longitudinally extending moulding 62. The track section 260 further comprises a series of downwardly extending lips 60 for cooperation with an underlying support section 25.

In use, track sections 260 of FIG. 13b are positioned and located on the support sections as shown in FIG. 13a. Two track sections 260 are positioned so as to abut each other at the crossover point of the grid structure formed by the support sections 25 on the uppermost layer of bin receiving units 50. The track sections 260 are arranged such that the joints at which any two track sections 260 abut is never positioned above a position where two sections of support section abut.

It will be appreciated that different forms of bin receiving unit 50 and bin 10 may be used.

Figure 14:
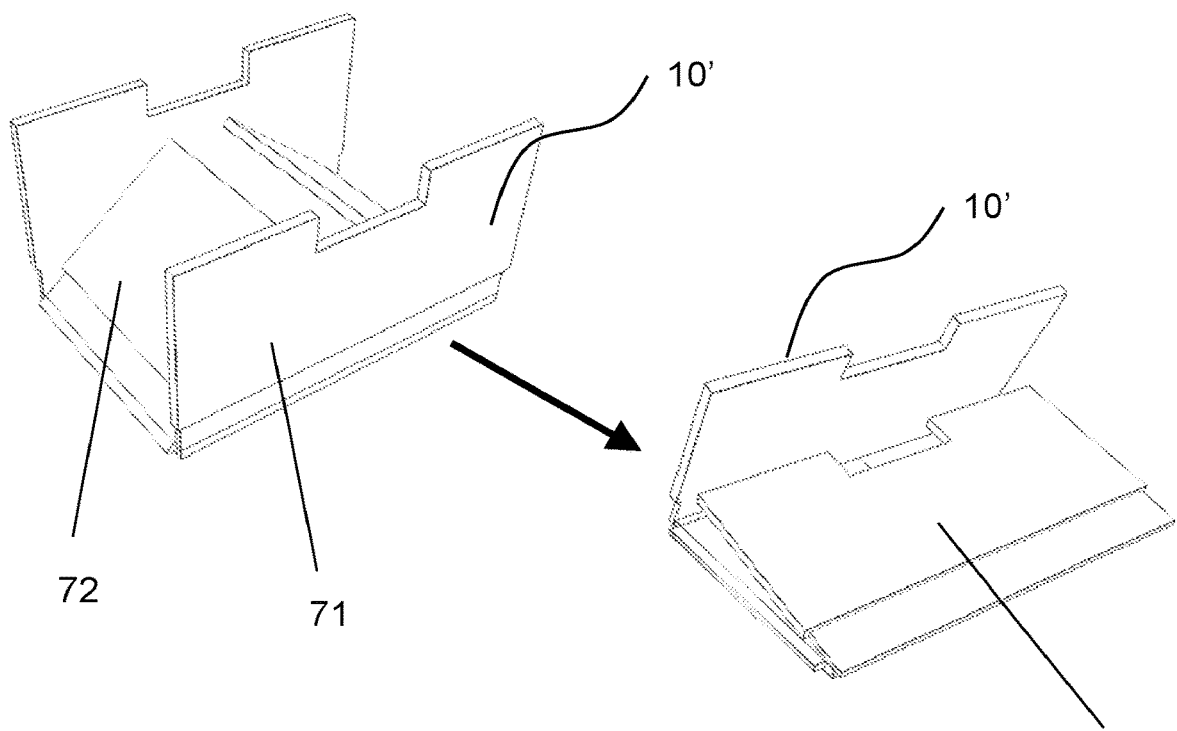
FIG. 14 shows an alternative form of bin 10 in accordance with another form of the invention.

FIG. 14 shows an alternative form of bin 10 in accordance with another form of the invention. The alternative bin 10 takes the form of a collapsible bin 10. In the embodiment shown in FIG. 14, the sides 72 fold inwardly and the sides 71 fold inwardly on top of the previously folded sides 72. Such collapsible bins are available in many forms such as IFCO™ containers and trays. Such collapsible bins 10 may be formed from any material having the required structural characteristics as described above, but may include plastics materials, metal alloys and other lightweight materials.

Figure 15:
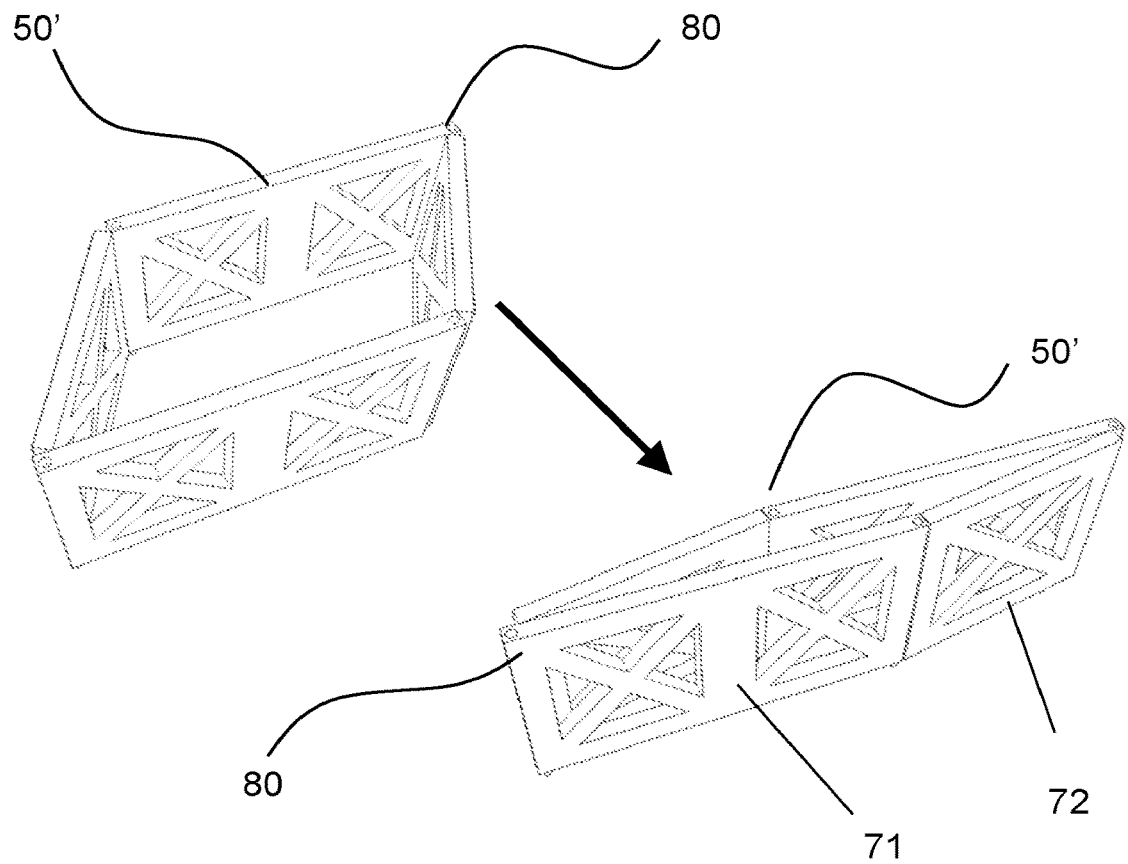
FIG. 15 shows and alternative form of bin receiving unit 50, in accordance with another form of the invention.

FIG. 15 shows and alternative form of bin receiving unit 50, in accordance with another form of the invention. The alternative bin receiving unit 50 comprises sides 71, 72 as described above with reference to FIGS. 5 to 11, however, the corners of the alternative bin receiving means 50 comprise hinging means 80. The presence of the hinging means 80 enables the bin receiving means 50' to be folded so as to be substantially flat. Such alternative bin receiving means 50' may be formed from any material having the required structural characteristics as described above, but may include plastics materials, metal alloys and other lightweight materials. The hinging means 80 may comprise any form of hinge such as butt hinges, recessed hinges, t-hinges, strap hinges or any form of hinge or mechanism suitable for enabling the alternative bin receiving units 50 to be foldable or collapsible.

It will be appreciated that the use of collapsible bins 10' as shown in FIG. 14 and collapsible bin receiving units 50' as shown in FIG. 15 reduces the volume required to ship the components of the storage system as these components may be shipped in their collapsed form.

There are many forms of collapsible container and the form shown in FIG. 14 is merely one preferred form. However, it will be appreciated that any suitable form of collapsible container or bin 10 may be used.

In this Way a Customised, Storage System of any Size and Shape can be Constructed and Deconstructed Quickly, and Efficiently.

This modular approach to storage structure construction overcomes the need for permanent infrastructure. Furthermore, the components of the storage system and storage system structure may in most cases be constructed from engineering polymers having sufficient strength and toughness to form such a structure, whilst reducing the weight for transportation and construction purposes.

Preferably all the components of the storage system according to the present invention are constructed from a high strength, mouldable material such as by way of example only, polypropylene, high density polyethylene (HDPE), polyvinyl chloride (PVC), acrylonitrile butadiene styrene (ABS), or polycarbonate or any composite combination thereof, which can be accurately, easily, quickly, and cheaply manufactured.

It will be appreciated that other structural materials may be used such as lightweight metal alloys or composites formed from any combination of suitable materials such as glass or carbon fibre reinforced plastics materials, having the appropriate structural characteristics.

Many variations and modifications not explicitly described above are also possible without departing from the scope of the invention as defined in the appended claims.

The invention claimed is:

1. A track structure for supporting movement of a load handling device on top of a grid storage structure, the track structure comprising:
   a plurality of track support sections arranged in a grid pattern; and
   a plurality of track sections mounted on top of the track support sections, said plurality of track sections being arranged in the grid pattern of the plurality of track support sections;
   wherein the plurality of track sections are arranged such that first joints at which any two track sections abut in the grid pattern are between second joints where two sections of the track support sections abut.

2. The track structure of claim 1, wherein each of the track sections includes a longitudinally extending moulding.

3. The track structure of claim 1, wherein each of the track sections includes a series of downwardly extending lips configured to releasably attach to the track support sections.

4. The track structure of claim 1, wherein each of the track support sections includes a longitudinally extending, substantially I-shaped cross-sectional beam.

5. The track structure of claim 1, wherein each of the track sections includes a substantially cross-shaped planar portion.

6. The track structure of claim 5, wherein each of the track sections includes a series of downwardly extending lips configured to releasably attach to the track support sections.

7. The track structure of claim 1, wherein the grid pattern of the plurality of track sections is defined by a first set of parallel tracks or rails and a second set of parallel tracks or rails extending transverse to the first set in a substantially horizontal plane.

8. The track structure of claim 7, wherein the track sections and/or the track support sections include a plastic material.

9. The track structure of claim 7, wherein each of the track sections includes a substantially cross-shaped planar portion.

10. The track structure of claim 7, wherein each of the track sections includes a longitudinally extending moulding.

11. The track structure of claim 7, wherein each of the track sections includes a series of downwardly extending lips configured to releasably attach to the track support sections.

12. The track structure of claim 7, wherein each of the track support sections includes a longitudinally extending, substantially I-shaped cross-sectional beam.

13. The track structure of claim 1, wherein the track sections and/or the track support sections include a plastic material.

14. The track structure of claim 13, wherein each of the track sections includes a substantially cross-shaped planar portion.

15. The track structure of claim 13, wherein each of the track sections includes a longitudinally extending moulding.

16. The track structure of claim 13, wherein each of the track sections includes a series of downwardly extending lips configured to releasably attach to the track support sections.

17. The track structure of claim 13, wherein each of the track support sections includes a longitudinally extending, substantially I-shaped cross-sectional beam.

18. A grid storage structure comprising:
a plurality of towers arranged in a grid pattern for receiving stacks of storage bins; and
a track structure for supporting movement of a load handling device on top of the grid storage structure, the track structure including,
a plurality of track support sections arranged in a grid pattern; and
a plurality of track sections mounted on top of the track support sections, said plurality of track sections being arranged in the grid pattern of the plurality of track support sections;
wherein the plurality of track sections is arranged such that first joints at which any two track sections abut in the grid pattern are between second joints where two sections of the track support sections abut, and
wherein the track structure is configured to be mounted on top of the plurality of towers.

19. The grid storage structure of claim 18, wherein the track supports sections are configured to interlock the towers.

20. The grid storage structure of claim 18,
wherein the grid pattern of the plurality of track sections is defined by a first set of parallel tracks or rails and a second set of parallel tracks or rails extending transverse to the first set in a substantially horizontal plane.

* * * * *